United States Patent
Lee et al.

(10) Patent No.: US 10,827,460 B2
(45) Date of Patent: Nov. 3, 2020

(54) METHOD FOR TRANSMITTING AND RECEIVING CONTROL INFORMATION FOR PAGING IN WIRELESS COMMUNICATION SYSTEM AND APPARATUS THEREFOR

(71) Applicant: LG Electronics Inc., Seoul (KR)

(72) Inventors: Jeongsu Lee, Seoul (KR); Hyunsoo Ko, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/752,118

(22) Filed: Jan. 24, 2020

(65) Prior Publication Data

US 2020/0163050 A1 May 21, 2020

Related U.S. Application Data

(63) Continuation of application No. PCT/KR2019/001847, filed on Feb. 14, 2019.

(60) Provisional application No. 62/630,302, filed on Feb. 14, 2018.

(51) Int. Cl.
*H04W 68/02* (2009.01)
*H04W 68/00* (2009.01)
*H04W 72/04* (2009.01)

(52) U.S. Cl.
CPC ......... *H04W 68/02* (2013.01); *H04W 68/005* (2013.01); *H04W 72/042* (2013.01)

(58) Field of Classification Search
CPC .. H04W 68/02; H04W 68/005; H04W 72/042
See application file for complete search history.

(56) References Cited

U.S. PATENT DOCUMENTS

2016/0227560 A1* 8/2016 Webb ............... H04W 72/1242
2019/0239187 A1* 8/2019 Islam .................... H04W 68/02

\* cited by examiner

*Primary Examiner* — Chuong A Ngo
(74) *Attorney, Agent, or Firm* — Fish & Richardson P.C.

(57) ABSTRACT

Disclosed herein is a method for transmitting and receiving control information for paging in a wireless communication system. Particularly, in a method for receiving a paging message in a wireless communication system according to an embodiment of the present invention, the method performed by a User Equipment may include receiving, from a base station, downlink control information (DCI) related to the paging message; and receiving the paging message based on the DCI, the DCI may include resource allocation information for the paging message and/or a short message related to system information, and the DCI may include at least one bit representing whether the resource allocation information and/or the short message are/is included in the DCI.

13 Claims, 8 Drawing Sheets

METHOD FOR TRANSMITTING AND RECEIVING CONTROL INFORMATION FOR PAGING IN WIRELESS COMMUNICATION SYSTEM AND APPARATUS THEREFOR

CROSS-REFERENCE TO RELATED APPLICATIONS

This application is a continuation of International Application No. PCT/KR2019/001847, filed on Feb. 14, 2019, which claims the benefit of U.S. Provisional Application No. 62/630,302, filed on Feb. 14, 2018. The contents of which are all hereby incorporated by reference herein in their entirety.

TECHNICAL FIELD

The present invention relates to a wireless communication system and, more particularly, to a method transmitting and receiving downlink control information for paging and an apparatus supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The present disclosure proposes a method for transmitting/receiving and designing downlink control information for paging.

Particularly, the present disclosure proposes a method for configuring and/or instructing such that partial system information is included or not included in DCI for paging.

Technical objects to be achieved in the present invention are not limited to the above-described technical objects, and other technical objects not described above may be evidently understood by a person having ordinary skill in the art to which the present invention pertains from the following description.

Technical Solution

In a method for receiving a paging message in a wireless communication system according to an embodiment of the present invention, the method performed by a User Equipment may include receiving, from a base station, downlink control information (DCI) related to the paging message; and receiving the paging message based on the DCI, the DCI may include resource allocation information for the paging message and/or a short message related to system information, and the DCI may include at least one bit representing whether the resource allocation information and/or the short message are/is included in the DCI.

In addition, in the method according to an embodiment of the present invention, the short message may include at least one of information related to a modification of the system information, indication information for Earthquake and Tsunami Warning System (ETWS) or indication information for Commercial Mobile Alert System (CMAS).

In addition, in the method according to an embodiment of the present invention, the indication information for Earthquake and Tsunami Warning System (ETWS) and the indication information for Commercial Mobile Alert System (CMAS) may be set to a high priority in the system information.

In addition, in the method according to an embodiment of the present invention, the number of the at least one bit may be 2.

In addition, in the method according to an embodiment of the present invention, a value of the at least one bit may indicate i) a first state which for a case that the resource allocation information is included in the DCI, ii) a second state which for a case that the short message is included in the DCI, or iii) a third state which for a case that the resource allocation information and the short message are included in the DCI.

In addition, in the method according to an embodiment of the present invention, when the short message is included in the DCI, the short message may not be forwarded through the paging message scheduled by the DCI.

In addition, in the method according to an embodiment of the present invention, the DCI may be scrambling by Paging-Radio Network Temporary Identifier (P-RNTI) related to the paging message.

In a User Equipment for receiving a paging message in a wireless communication system according to an embodiment of the present invention, the User Equipment may include a Radio Frequency (RF) unit configured to transmit and receive a radio signal; and a processor functionally connected with the RF unit, and the processor is configured to control to: receive, from a base station, downlink control information (DCI) related to the paging message; and receive the paging message based on the DCI, the DCI may include resource allocation information for the paging message and/or a short message related to system information, and the DCI may include at least one bit representing whether the resource allocation information and/or the short message are/is included in the DCI.

In addition, in the User Equipment according to an embodiment of the present invention, the short message may include at least one of information related to a modification of the system information, indication information for Earthquake and Tsunami Warning System (ETWS) or indication information for Commercial Mobile Alert System (CMAS).

In addition, in the User Equipment according to an embodiment of the present invention, the indication information for Earthquake and Tsunami Warning System (ETWS) and the indication information for Commercial Mobile Alert System (CMAS) may be set to a high priority in the system information.

In addition, in the User Equipment according to an embodiment of the present invention, the number of the at least one bit may be 2.

In addition, in the User Equipment according to an embodiment of the present invention, a value of the at least one bit may indicate i) a first state which for a case that the resource allocation information is included in the DCI, ii) a second state which for a case that the short message is included in the DCI, or iii) a third state which for a case that the resource allocation information and the short message are included in the DCI.

In addition, in the User Equipment according to an embodiment of the present invention, when the short message is included in the DCI, the short message may not be forwarded through the paging message scheduled by the DCI.

In addition, in the User Equipment according to an embodiment of the present invention, the DCI may be scrambling by Paging-Radio Network Temporary Identifier (P-RNTI) related to the paging message.

In a base station for receiving a paging message in a wireless communication system according to an embodiment of the present invention, the base station may include a Radio Frequency (RF) unit configured to transmit and receive a radio signal; and a processor functionally connected with the RF unit, and the processor is configured to control to: transmit, to a User Equipment, downlink control information (DCI) related to the paging message; and transmit the paging message based on the DCI to a User Equipment, the DCI may include resource allocation information for the paging message and/or a short message related to system information, and the DCI may include at least one bit representing whether the resource allocation information and/or the short message are/is included in the DCI.

Advantageous Effects

According to an embodiment of the present invention, there is an advantage that an efficient paging operation can be supported even for the case that both of scheduling information and a short message are included in DCI for paging as well as the case that either one of scheduling information or a short message is included in DCI for paging.

In addition, according to the present invention, there is an advantage that PDSCH decoding overhead and delay of a User Equipment related to paging can be reduced, and unnecessary paging message/reception for PDSCH/decoding operation can be reduced.

Effects which may be obtained in the present invention are not limited to the above-described effects, and other technical effects not described above may be evidently understood by a person having ordinary skill in the art to which the present invention pertains from the following description.

DESCRIPTION OF DRAWINGS

The accompanying drawings, which are included herein as a part of a description in order to help understanding of the present disclosure, provide embodiments of the present disclosure, and describe the technical features of the present disclosure with the description below.

MODE FOR INVENTION

Figure 1:
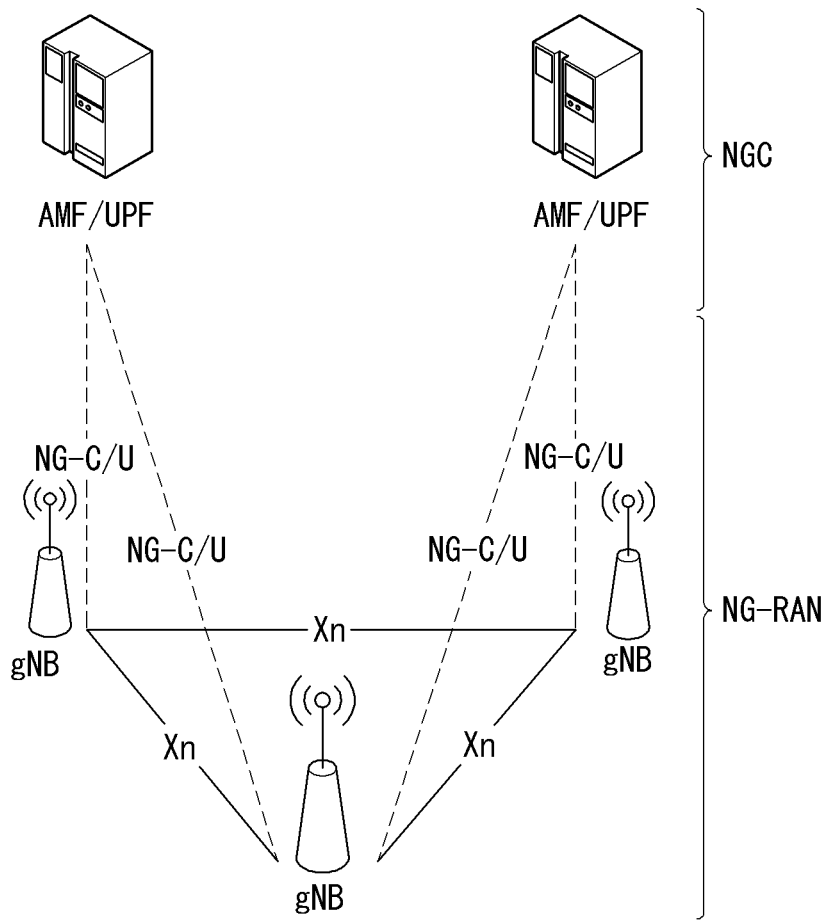
FIG. 1 is a diagram illustrating an example of an overall structure of a new radio (NR) system to which a method proposed by the present disclosure may be implemented.

Hereinafter, some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), an access point (AP), or generation NB (general NB, gNB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (Wi-MAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/New RAT (NR) is chiefly described, but the technical characteristics of the present disclosure are not limited thereto.

As propagation of smart phones and Internet of things (IoT) terminals rapidly spreads, the amount of information which is transmitted and received through a communication network increase. Accordingly, in the next generation wireless access technology, an environment (e.g., enhanced mobile broadband communication) that provides a faster service to more users than existing communication systems (or existing radio access technology) needs to be considered.

To this end, a design of a communication system that considers machine type communication (MTC) providing a service by connecting multiple devices and objects is discussed. Further, a design of a communication system (e.g., Ultra-Reliable and Low Latency Communication (URLLC)) considering a service and/or a user equipment sensitive to reliability and/or latency of communication is also discussed.

Hereinafter, in this disclosure, for the convenience of description, the next-generation wireless access technology is referred to as a new radio access technology (New RAT; NR) and the wireless communication system to which the NR is applied is referred to as an NR system.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface.

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
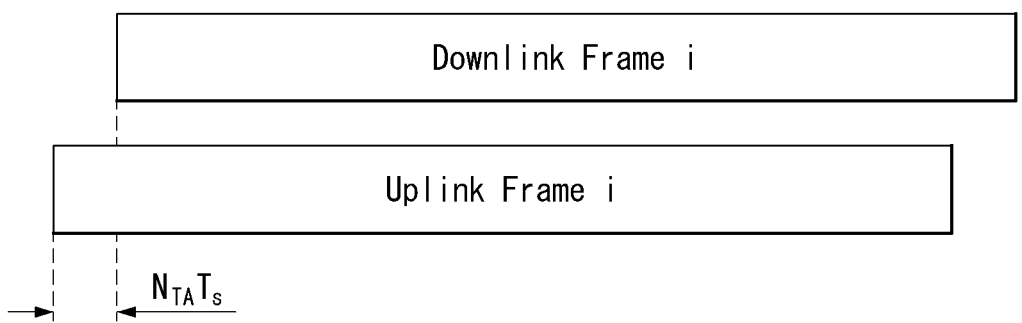
FIG. 2 illustrates a relationship between an uplink (UL) frame and a downlink (DL) frame in a wireless communication system to which a method proposed by the present disclosure may be implemented.

FIG. 2 illustrates a relationship between a UL frame and a DL frame in a wireless communication system to which a method proposed by the present disclosure may be implemented.

As illustrated in FIG. 2, a UL frame number I from a user equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots, \mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 represents the number of OFDM symbols $N_{symb}^{slot}$ per slot in a normal CP, the number of slot $N_{slot}^{frame,\mu}$ per radio frame and the number of slot $N_{slot}^{subframe,\mu}$ per subframe, and Table 3 represents the number of OFDM symbols in an extended CP, the number of slot per radio frame and the number of slot per subframe.

TABLE 2

| μ | $N_{symb}^{slot}$ | $N_{slot}^{frame,\mu}$ | $N_{slot}^{sub-frame,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{sub-frame,\mu}$ |
|---|---|---|---|
| 2 | 12 | 40 | 4 |

Figure 3:
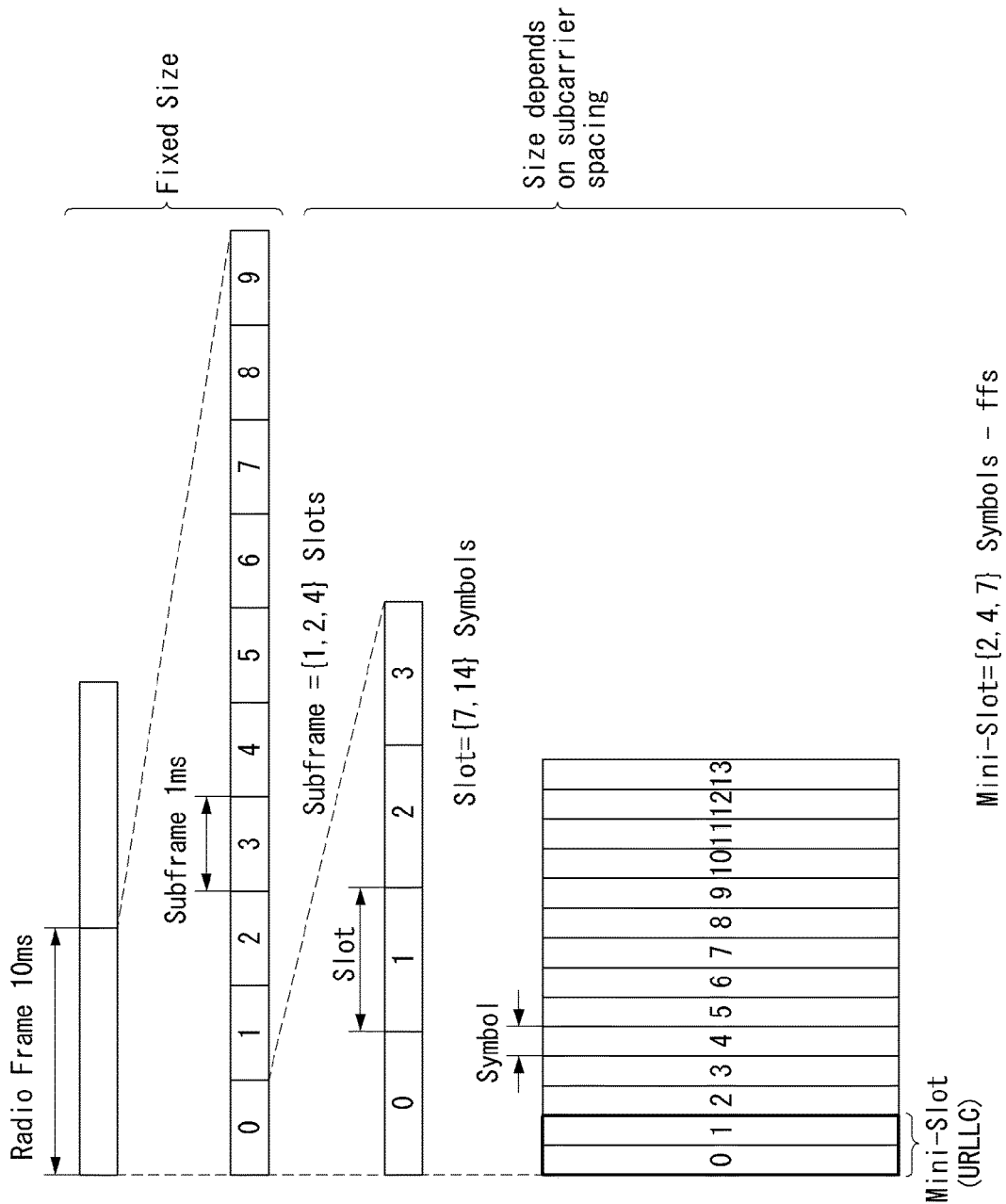
FIG. 3 illustrates an example of a frame structure in the NR system.

FIG. 3 illustrates an example of a frame structure in the NR system. FIG. 3 is shown just for the convenience of description but is not intended to limit the scope of the present invention.

Table 3 represents an example of μ=2, that is, the case that subcarrier spacing is 60 kHz. Referring to Table 2, 1 subframe (or frame) may include 4 slots. 1 subframe={1, 2, 4} slots shown in FIG. 3 are an example, and the number of slot(s) included in 1 subframe can be defined as represented in Table 2.

In addition, a mini-slot may include 2, 4 or 7 symbols, or include the more or the less symbols.

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 4:
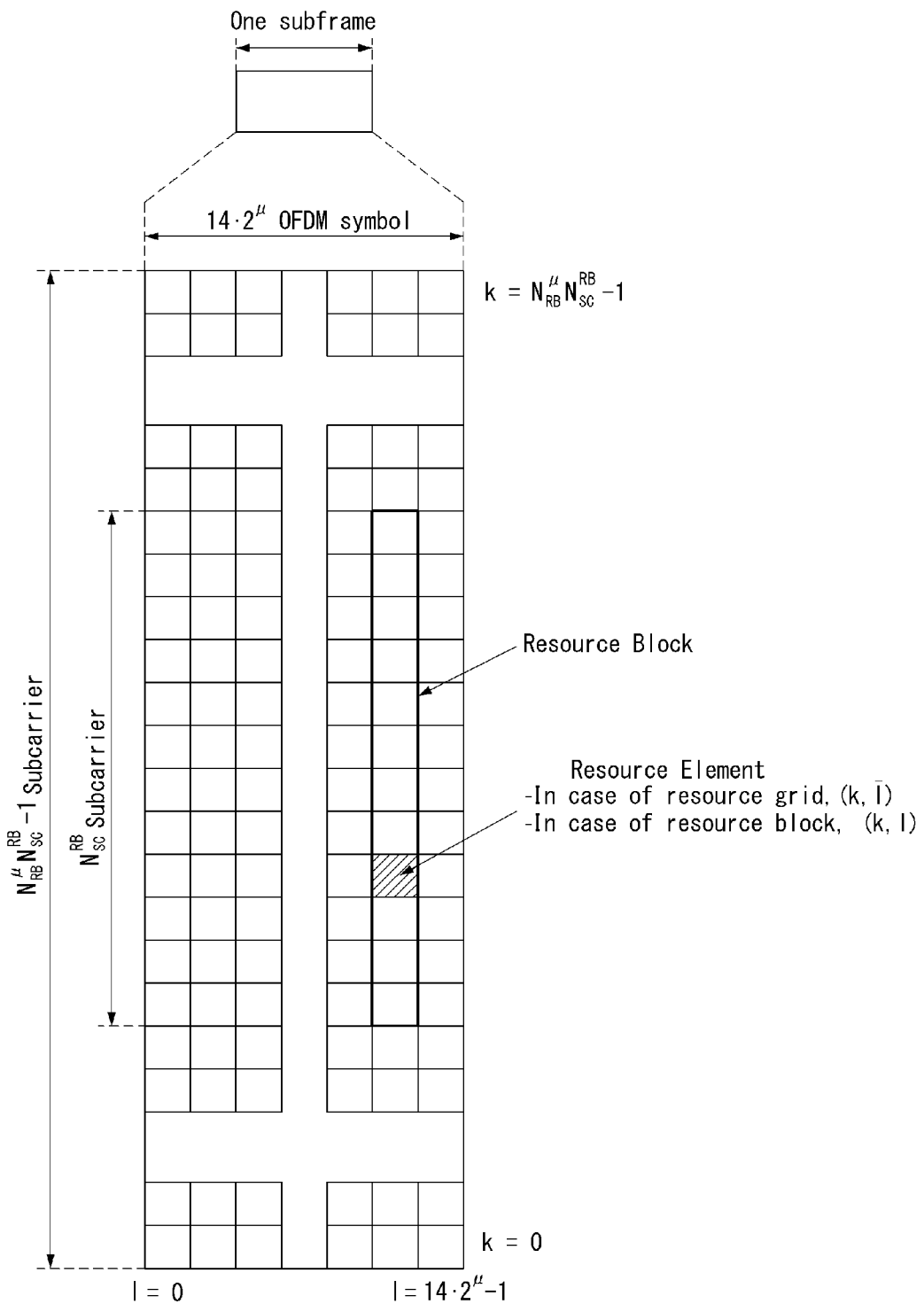
FIG. 4 illustrates an example of a resource grid supported in a wireless communication system to which a method proposed by the present disclosure may be implemented.

FIG. 4 illustrates an example of a resource grid supported in a wireless communication system to which a method proposed by the present disclosure may be implemented.

Referring to FIG. 4, a resource grid is composed of $N_{RB}^\mu N_{sc}^{RB}$ subcarriers in a frequency domain, each subframe composed of $14 \cdot 2^\mu$ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols Herein, $N_{RB}^\mu \leq N_{RB}^{max,\mu}$. The above $N_{RB}^{max,\mu}$ indicates the maximum transmission bandwidth, and it may change not just between numerologies, but between UL and DL.

Figure 5:
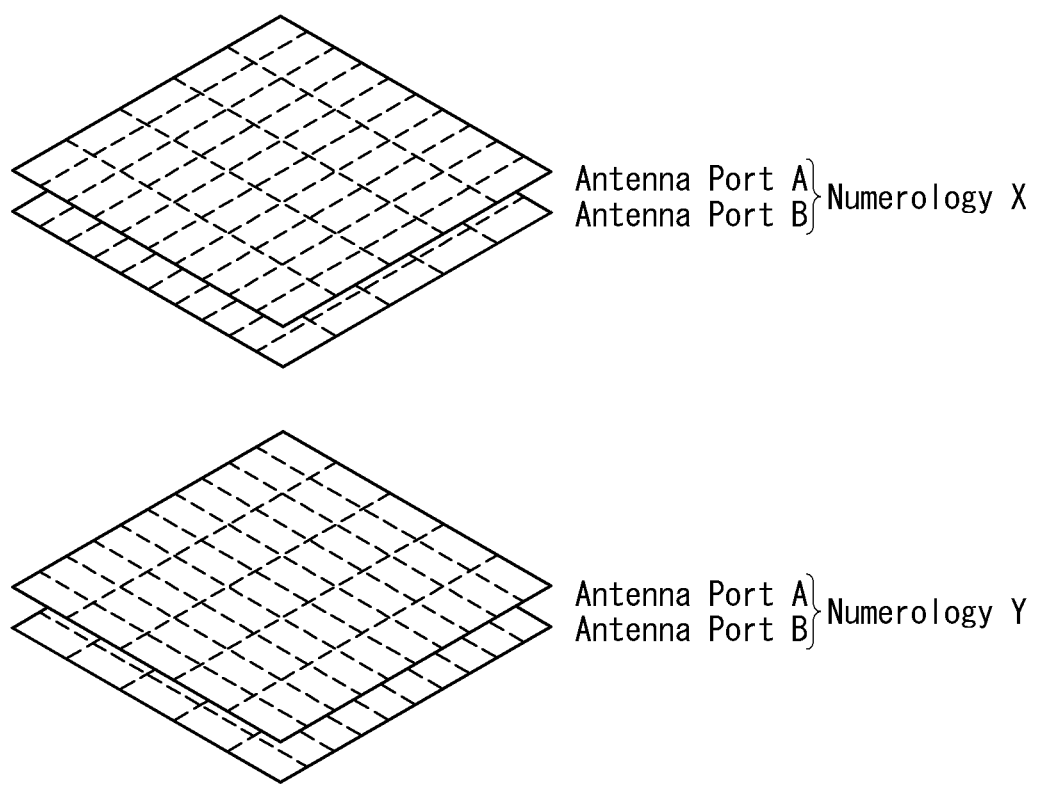
FIG. 5 illustrates examples of resource grids for each antenna port and numerology to which a method proposed in this specification may be applied.

In this case, as illustrated in FIG. 5, one resource grid may be configured for the numerology μ and an antenna port p.

FIG. 5 illustrates examples of resource grids for each antenna port and numerology to which a method proposed in this specification may be applied.

Each element of the resource grid for the numerology μ and the antenna port p is indicated as a resource element, and may be uniquely identified by an index pair (k,l̄). Herein, $k=0, \ldots, N_{RB}^\mu N_{sc}^{RB}-1$ is an index in the frequency domain, and $\bar{l}=0, \ldots, 2^\mu N_{symb}^{(\mu)}-1$ indicates a location of a symbol in a subframe. To indicate a resource element in a slot, the index pair (k,l) is used. Herein, $l=0, \ldots, N_{symb}^\mu-1$.

The resource element (k,l̄) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}=12$ consecutive subcarriers on a frequency domain.

Point A plays the role of a common reference point of the resource block grid and may be obtained as follows:
offsetToPointA with respect to Pcell downlink represents a frequency offset between the lowest subcarrier of the lowest resource block overlapped with SS/PBCH block used by a UE for an initial cell selection with point A, and represents by resource block units assuming 15 kHz subcarrier spacing for FR1 and 60 kHz subcarrier spacing for FR2;

absoluteFrequencyPointA represents frequency-position of point A represented as in absolute radio-frequency channel number (ARFCN).

Common resource blocks are numbered from 0 to upper sides in a frequency domain for subcarrier spacing configuration μ.

The center of subcarrier 0 of common resource block 0 for the subcarrier spacing configuration μ coincides with 'point A'. Resource element (k, l) for the common resource block number and the subcarrier spacing configuration μ in a frequency domain may be given as represented in Equation 1 below.

$$n_{CRB}^{\mu} = \left\lfloor \frac{k}{N_{sc}^{RB}} \right\rfloor \qquad \text{Equation 1}$$

Herein, k may be defined relatively to point A such that k=0 corresponds to the subcarrier with point A in the center. The number from 0 to $N_{BWP,i}^{size}-1$ are numbered to the physical resource blocks in a bandwidth part (BWP) and i is the number of the BWP. In BWP i, the relation between the physical resource block $n_{PRB}$ and the common resource block $n_{CRB}$ may be given as represented in Equation 2 below.

$$n_{CRB} = n_{PRB} + N_{BWP,i}^{start} \qquad \text{Equation 2}$$

Herein, $N_{BWP,i}^{start}$ may be the common resource block in which the BWP starts relatively to common resource block 0.

Self-Contained Structure

A time division duplexing (TDD) structure considered in the NR system is a structure in which both uplink (UL) and downlink (DL) are processed in one slot (or subframe). This is to minimize the latency of data transmission in the TDD system and the structure may be referred to as a self-contained structure or a self-contained slot.

Figure 6:
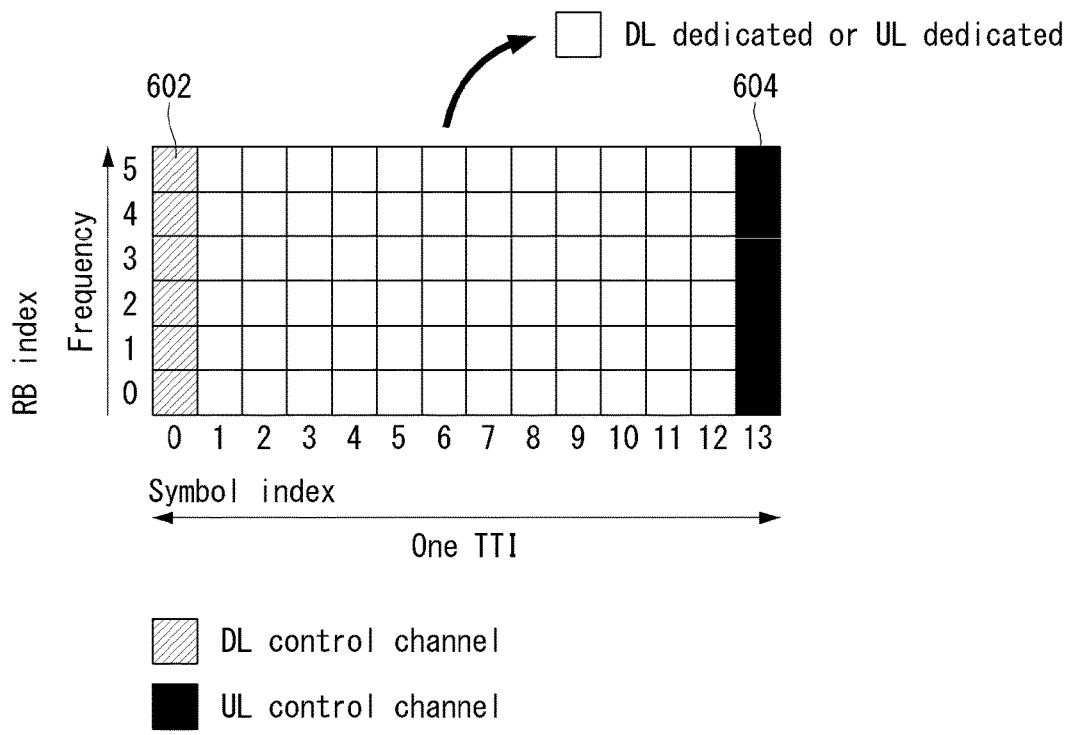
FIG. 6 illustrates one example of a self-contained structure to which the method proposed in this disclosure may be applied.

FIG. 6 illustrates one example of a self-contained structure to which the method proposed in this disclosure may be applied. FIG. 6 is shown just for convenience of the description and does not limit the scope of the present invention.

Referring to FIG. 6, it is assumed that one transmission unit (e.g., slot or subframe) is constituted by 14 orthogonal frequency division multiplexing (OFDM) symbols as in legacy LTE.

In FIG. 6, a region 602 refers to a downlink control region and a region 604 refers to an uplink control region. Further, a region (that is, a region without a separate indication) other than the regions 602 and 604 may be used for transmitting downlink data or uplink data.

That is, uplink control information and downlink control information may be transmitted in one self-contained slot. On the contrary, in the case of data, the uplink data or downlink data may be transmitted in one self-contained slot.

When the structure illustrated in FIG. 6 is used, in one self-contained slot, downlink transmission and uplink transmission may sequentially proceed, and transmission of the downlink data and reception of uplink ACK/NACK may be performed.

Consequently, when an error of data transmission occurs, a time required for retransmitting data may be reduced. Therefore, latency associated with data delivery may be minimized.

In the self-contained slot structure illustrated in FIG. 6, a time gap for a process of switching from a transmission mode to a reception mode in a base station (eNodeB, eNB, or gNB) and/or a terminal (user equipment (UE)) or a process of switching from the reception mode to the transmission mode is required. In association with the time gap, when the uplink transmission is performed after the downlink transmission in the self-contained slot, some OFDM symbol(s) may be configured as a guard period (GP).

In the present disclosure, it is proposed a method for designing downlink control information (i.e., DCI format) for paging in a next generation wireless communication system. Particularly, it is described a method for configuring the contents (i.e., field, bit, etc.) of DCI format 1_0 which may be considered as the DCI for paging in the NR system. Here, the DCI for paging may be an identifier related to paging (e.g., P-RNTI) and mean cyclic redundancy check (CRC)-scrambled DCI format.

In the NR system, 1-bit information is considered, which represents (i.e., indicates) whether only a short message is included, or only scheduling information is included in the DCI for paging. Here, the short message may include a message related to a modification of system information (SI) (e.g., system information modification) and/or urgent system information (e.g., Earthquake and Tsunami Warning System (ETWS), Commercial Mobile Alert System (CMAS), etc.). In addition, the scheduling information may include resource allocation information for scheduling (e.g., resource allocation on a frequency domain, resource allocation on a time domain, etc.) such as a PDSCH.

The 1-bit information described above may be similar to the flag bit used for a direct indication in the existing system (e.g., LTE system). An example of the DCI format therefor may be as shown in FIGS. 7A and 7B.

Figure 7A:
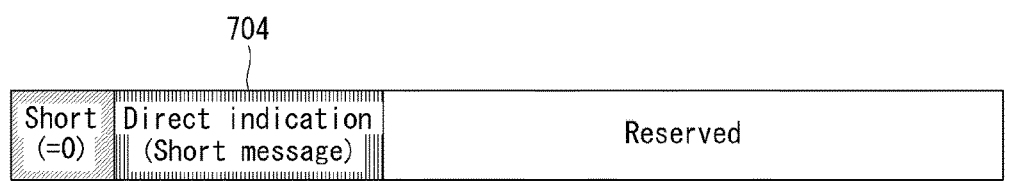
FIGS. 7A and 7B illustrate examples of a DCI format for paging applicable in a wireless communication system.
Figure 7B:
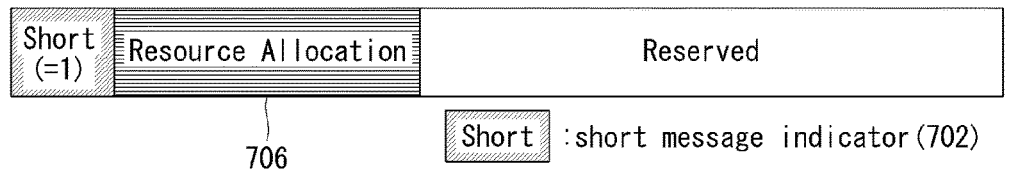

FIGS. 7A and 7B illustrate examples of a DCI format for paging applicable in a wireless communication system. FIGS. 7A and 7B are shown just for convenience of the description and does not limit the scope of the present invention.

Referring to FIGS. 7A and 7B, in DCI format 6_2 considered as DCI for paging in the conventional system, it is assumed that the lowest single information bit plays the role of the flag bit described above (i.e., 1-bit information).

That is, the DCI for paging may include a short message indicator 702 representing whether a direct indication information (i.e., information corresponding to the short message described above) corresponds to the corresponding DCI.

For example, in the case that the value of the corresponding indicator is '0', the DCI for paging may be configured to include only direct indication information (i.e., direct indication filed 704) for paging. Different from this, in the case that the value of the corresponding indicator is '1', the DCI for paging may be configured to include only resource allocation information (i.e., resource allocation field 706).

It may be considered a method of reusing the framework shown in FIGS. 7A and 7B described above (i.e., DCI format structure) for paging in the NR system.

In addition, in the NR system, it is required to define contents (i.e., detailed information or element) of configuring the short message (i.e., direct indication information) described above.

For example, it is assumed that the NR system supports the framework of DCI format 6_2 for paging in the LTE system described above in relation to paging. In this case, in the NR system, it may be required to redefine the contents of a short message for a paging message and scheduling information.

First, the short message, that is, the direct indication information may be configured with 8 bits. Each of the bits may represent (or indicate) a modification of system information (systemInfoModification, 1 bit), urgent system information (1 bit related to the ETWS and/or 1 bit related to the CMAS), other system information (e.g., 1 bit of eab-ParamModification and 1 bit of eDRXInfoModification) and a reserved bit.

Next, the scheduling information of the paging message is described in detail. For example, DCI format 1_0 considered in the NR system may include various contents. However, the HARQ process and the power control are not required for paging, inclusion of such information in the corresponding scheduling information may not be essential. For example, the information for the HARQ process and the power control may be a new data indicator, a redundancy version, a HARQ process number, a PDSCH-to-HARQ feedback timing indicator, a downlink assignment index, a PUCCH resource indicator, and/or a TPC command for scheduled PUCCH, and the like.

That is, in the case of scheduling in a paging message (i.e., in the case of scheduling information to be included in the DCI for paging), only a time domain, a frequency domain, and/or information related to decoding may be essential.

However, when a base station (e.g., gNB) transmits the paging DCI to indicate the short message(s), the paging message may not be forwarded to IDLE UEs during a long-time duration. In addition, when a base station triggers a resource allocation in the paging DCI, an RRC-CONNECTED UE may be required to perform a PDCCH decoding operation for obtaining information of a modification of system information and/or urgent system information. Such a decoding operation may cause redundant decoding complexity and increase decoding latency.

In other words, like the conventional scheme, it may be required to consider the case that the scheduling information and partial system information (particularly, partial short message) are included in the DCI for paging as well as the case that either only the short message (i.e., direct indication information) or only the scheduling information (i.e., resource allocation information) is included in the DCI for paging.

That is, it may be required to consider an indicator additionally, which is related to whether the scheduling information (i.e., resource allocation information) and the partial system information are included in the DCI for paging.

Figure 8:
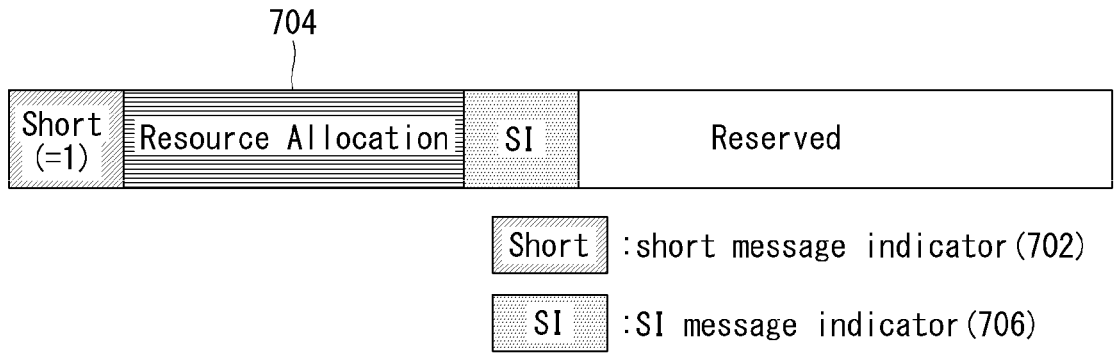
FIG. 8 illustrates an example of a DCI format for paging to which the method proposed in the present disclosure may be applied.

FIG. 8 illustrates an example of a DCI format for paging to which the method proposed in the present disclosure may be applied. FIG. 8 is shown just for convenience of the description and does not limit the scope of the present invention.

Referring to FIG. 8, the value of a short message indicator 702 is set to and it is assumed that scheduling information, that is, resource allocation information 704 is included in the DCI for paging.

At this time, it may be considered a method of introducing an indicator 706 related to whether a system information message is existed, additionally in the resource allocation information, that is, resource allocation bit field. As an example, the corresponding indicator may be referred to as an SI message indicator and configured with 1 bit.

Here, the corresponding indicator may correspond to an indication bit for representing whether a paging message (e.g., RRC page message) includes pagingRecordList only or both of pagingRecordList and SI modification information. The SI modification information may include the short message described above, that is, direct indication information, and the like as well as the information which is directly related to a modification of the system information. As an example, the RRC page message may be forwarded through a higher layer signaling.

In this case, according to the SI message indicator described above, a UE (e.g., RRC CONNECTED UE) may be configured to or not to decode the corresponding PDSCH.

Figure 9:
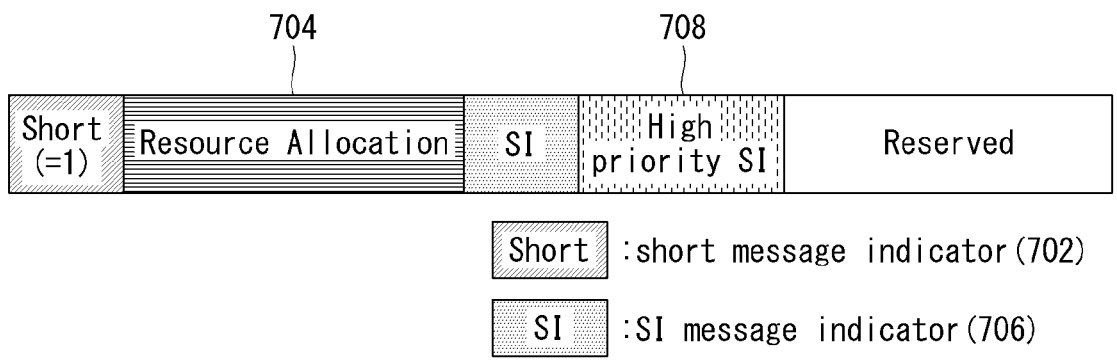
FIG. 9 illustrates another example of a DCI format for paging to which the method proposed in the present disclosure may be applied.

FIG. 9 illustrates another example of a DCI format for paging to which the method proposed in the present disclosure may be applied. FIG. 9 is shown just for convenience of the description and does not limit the scope of the present invention.

Referring to FIG. 9, the value of a short message indicator 702 is set to and it is assumed that scheduling information, that is, resource allocation information 704 is included in the DCI for paging.

At this time, it may be considered a method of introducing an indicator 706 related to whether a system information message is existed and an indicator 708 related to system information of high priority, additionally in the resource allocation information, that is, resource allocation bit field. As an example, the SI message indicator may be configured with 1 bit and the system information of high priority may be configured with Y bits (herein, Y is a positive integer).

That is, in addition to the resource allocation information and the short message indicator, the system information related information configured with 1+Y bits may be additionally included in the DCI for paging. Here, the system information of high priority (or the corresponding information indicator) may mean specific system information such as information in which high priority may be set among all types of system information (e.g., systemInfoModification, ETWS, CMAS, eab-ParamModification, eDRXInfoModification, etc.) which may be configured to a UE.

As an example, a part of system information (e.g., ETWS, CMAS, etc.) may be required to be urgently forwarded to UE(s) among many types of system information. In the case that such types of urgent information are included in the paging message, the UE needs to receive the corresponding PDSCH and perform data decoding.

Considering such a case, in order to reduce processing delay for decoding a PDSCH, a part of system information of which importance is high needs to be directly indicated through DCI, not through the paging message. That is, it may be considered a method of directly forwarding part of system information through the DCI for paging, not through the paging message.

In this case, a fact on whether the part of system information is included in the paging message may be related to a fact on whether the corresponding part of system information is included in the DCI for paging. As an example, the fact that urgent system information is included in the paging message may mean that the corresponding urgent system information is not included in the DCI for paging, and on the contrary, the fact that the urgent system information is not included in the paging message may mean that the corresponding urgent system information is included in the DCI for paging. The related indication information may be indicated through the SI message indicator 706.

As described above, in the DCI for paging (i.e., the DCI scrambled with P-RNTI), the 1+Y bits described above may play the role of the SI message indicator (e.g., 1 bit) and the system information (indicator) of high priority (e.g., Y bits).

In other words, in the NR system, a simultaneous indication may be allowed for the resource allocation information and the part of system information (e.g., SI modification notification, etc.) in the paging DCI. At this time, one or more additional bits may be allocated for the part of system information in addition to the bit (field) for indicating the resource allocation information. For example, as shown in FIG. 8, the SI message indicator configured with 1 bit may be introduced, and as shown in FIG. 9, 1+Y bits may be introduced for the SI message indicator and the system information (indicator) of high priority (e.g., ETWS, CMAS, etc.).

In addition, in relation to the paging DCI described above, the corresponding DCI format may be configured as represented by the following examples. The DCI format for paging may be a DCI format (Z) which is scrambled by P-RNTI.

For example, the DCI format for paging may include a flag (1-bit information) distinguishing paging or direct indication. Here, it may be configured that the fact that a value of the flag is '0' represents a direction indication (i.e., short message) and the fact that a value of the flag is '1' represents paging.

In addition, in the case that a value of the flag is 0, the DCI format for paging may further include reserved information bit(s) until the DCI format size becomes identical to the DCI format size in the case that the direct indication information (e.g., X bits) and the value of the flag are 1.

Alternatively, in the case that a value of the flag is 0, the DCI format for paging may further include the flag related to the system information (e.g., the SI message indicator and/or the information of 1-bit or more of the system information of high priority and the like described above in FIG. 9) and the scheduling information (i.e., the scheduling information for a PDSCH). Here, the scheduling information may include resource allocation information on a frequency domain (e.g., $\lceil \log_2(N_{RB}^{DL,BWP}(N_{RB}^{DL,BWP}+1)/2) \rceil$), resource allocation information on a time domain (e.g., X bits), information related to Modulation and Coding Scheme (MCS) (e.g., 5 bits), TPC command for a scheduling PUCCH set to 'zero', an identifier for DCI format (e.g., 1 bit), a new data indicator (e.g., 1 bit), a redundancy version (e.g., 2 bits), a HARQ process number (e.g., 4 bits), a PDSCH-to-HARQ feedback timing indicator (e.g., 3 bits), a downlink allocation index (e.g., 2 bits) and/or a PUCCH resource indicator (e.g., 2 bits).

In addition, owing to the beam sweeping operation introduced in the NR system, an additional paging delivery mechanism needs to be considered for reducing paging overhead in the NR system.

In relation to this, to reduce a wake-up time for paging, a method of dividing UEs into sub-groups may be considered. In this case, a paging group indicator may be additionally discussed, and required to be introduced.

The configuration for such a paging group indicator may be forwarded by using additional RNTI or forwarded through DCI. However, in the case that additional RNTI is introduced to represent the paging group indicator, blind decoding complexity may become serious in UE aspect. Accordingly, it is preferable that the information for the paging group indicator is forwarded through DCI. In addition, it may be required to introduce additional bit(s) for distinguishing versions (e.g., Release) of UEs.

Hereinafter, FIG. 10 and FIG. 11 and the description therefor are in relation to an operation method and apparatus of a UE and an operation method and apparatus of a base station that perform a paging operation based on the DCI format for paging proposed in the present disclosure.

Figure 10:
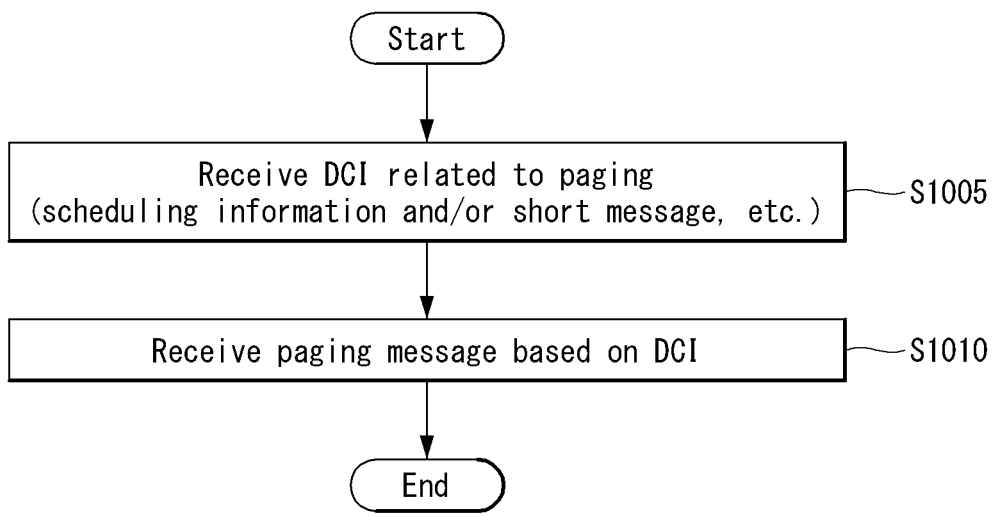
FIG. 10 illustrates an example of an operation flowchart of a UE performing paging in a wireless communication system to which the method proposed in the present disclosure may be applied.

FIG. 10 illustrates an example of an operation flowchart of a UE performing paging in a wireless communication system to which the method proposed in the present disclosure may be applied. FIG. 10 is shown just for convenience of the description and does not limit the scope of the present invention.

Referring to FIG. 10, when a UE and/or a base station perform a paging operation (e.g., operation of transmitting and receiving a paging message), it is assumed the operation is based on the method described in the present disclosure, that is, the method of using the DCI format for paging described above. As an example, the DCI described herein may be a DCI format which is scrambled by P-RNTI related to paging (e.g., DCI format 1_0 CRC-scrambled by P-RNTI).

First, the UE may receive downlink control information (DCI) related to the paging message from the base station (step, S1005). As an example, the DCI may correspond to the DCI format described above in the present disclosure (e.g., the DCI format shown in FIG. 9).

Particularly, the DCI may include resource allocation information for the paging message and/or a short message related to system information. For example, the resource allocation information may be the scheduling information described above, and the short message may be referred to as direct indication information.

As described above, the short message may include at least one of information related to a modification of the system information, indication information for Earthquake and Tsunami Warning System (ETWS) or indication information for Commercial Mobile Alert System (CMAS). Particularly, the indication information for Earthquake and Tsunami Warning System (ETWS) and the indication information for Commercial Mobile Alert System (CMAS) may set to a high priority in the system information (e.g., system information (indicator) of high priority).

In addition, the DCI may include at least one bit representing whether the resource allocation information and/or the short message are/is included in the DCI. At this time, as described above, the number of the at least one bit may be 2 (i.e., 2 bits). In this case, a value of the at least one bit may be configured to indicate i) a first state which for a case that the resource allocation information is included in the DCI, ii) a second state which for a case that the short message is included in the DCI, or iii) a third state which for a case that the resource allocation information and the short message are included in the DCI. As an example, the at least one bit may be the bit for short message indicator and the bit for SI message indicator shown in FIG. 9.

Later, the UE may receive the paging message based on the DCI from the base station (step, S1010). In other words, the UE may receive the paging message scheduled by the DCI (from the base station) and perform the paging operation. As an example, the paging message may be carried by a physical downlink shared channel (PDSCH) and the like which is scheduled by the DCI.

At this time, in the case that the short message is included in the DCI, the short message may be configured not to be forwarded through the paging message scheduled by the DCI. That is, in the case that the short message is included in the DCI, the UE may not perform decoding for the corresponding PDSCH.

Figure 12:
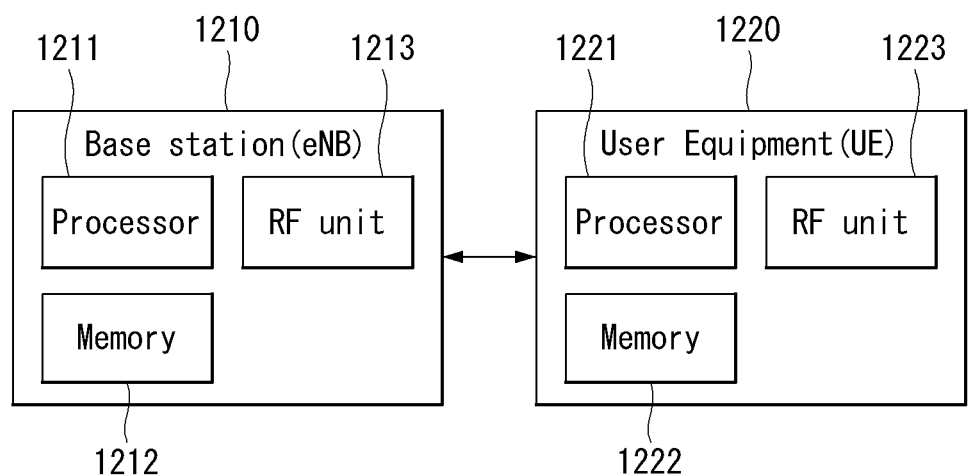
FIG. 12 illustrates an example of a block diagram of a wireless communication apparatus to which the method proposed in the present disclosure may be applied.
Figure 13:
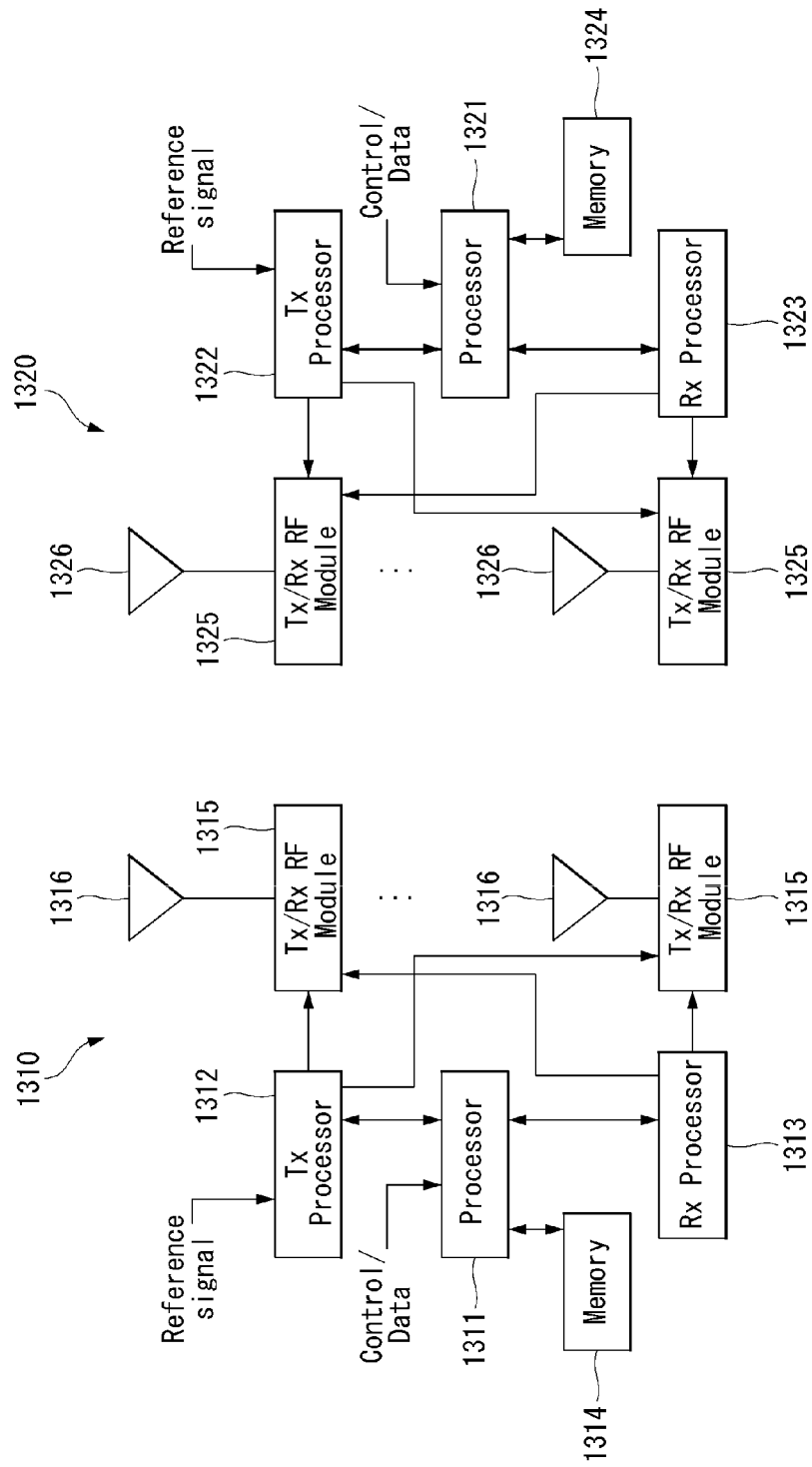
FIG. 13 illustrates another example of a block diagram of a wireless communication apparatus to which the method proposed in the present disclosure may be applied.

In relation to this, in the aspect of implementation, the operation of the UE described above may be particularly implemented by the UE 1220 or 1320 shown in FIG. 12 and FIG. 13 of the present disclosure. For example, the operation of the UE described above may be performed by a processor 1221 or 1321 and/or a Radio Frequency (RF) unit (or module) 1223 or 1325.

The UE performing paging (i.e., operation of transmitting and receiving a paging message) in a wireless communication system may include a transmitter for transmitting a wireless signal, a receiver for receiving a wireless signal and a processor functionally connected with the transmitter and the receiver. Here, the transmitter and the receiver may be referred to as an RF unit (or module) for transmitting and receiving a wireless signal.

For example, the processor of the UE may control the (reception) RF unit (or module) so as to receive downlink control information (DCI) related to the paging message from the base station (step, S1005). As an example, the DCI may correspond to the DCI format described above in the present disclosure (e.g., the DCI format shown in FIG. 9).

Particularly, the DCI may include resource allocation information for the paging message and/or a short message related to system information. For example, the resource allocation information may be the scheduling information described above, and the short message may be referred to as direct indication information.

As described above, the short message may include at least one of information related to a modification of the system information, indication information for Earthquake and Tsunami Warning System (ETWS) or indication information for Commercial Mobile Alert System (CMAS). Particularly, the indication information for Earthquake and Tsunami Warning System (ETWS) and the indication information for Commercial Mobile Alert System (CMAS) may set to a high priority in the system information (e.g., system information (indicator) of high priority).

In addition, the DCI may include at least one bit representing whether the resource allocation information and/or the short message are/is included in the DCI. At this time, as described above, the number of the at least one bit may be 2 (i.e., 2 bits). In this case, a value of the at least one bit may be configured to indicate i) a first state which for a case that the resource allocation information is included in the DCI, ii) a second state which for a case that the short message is included in the DCI, or iii) a third state which for a case that the resource allocation information and the short message are included in the DCI. As an example, the at least one bit may be the bit for short message indicator and the bit for SI message indicator shown in FIG. 9.

Later, the processor of the UE may control so as to receive the paging message based on the DCI from the base station (step, S1010). In other words, the processor of the UE may control the (reception) RF module to receive the paging message scheduled by the DCI (from the base station) and perform the paging operation. As an example, the paging message may be carried by a physical downlink shared channel (PDSCH) and the like which is scheduled by the DCI.

At this time, in the case that the short message is included in the DCI, the short message may be configured not to be forwarded through the paging message scheduled by the DCI. That is, in the case that the short message is included in the DCI, the processor of the UE may control not to perform decoding for the corresponding PDSCH.

Figure 11:
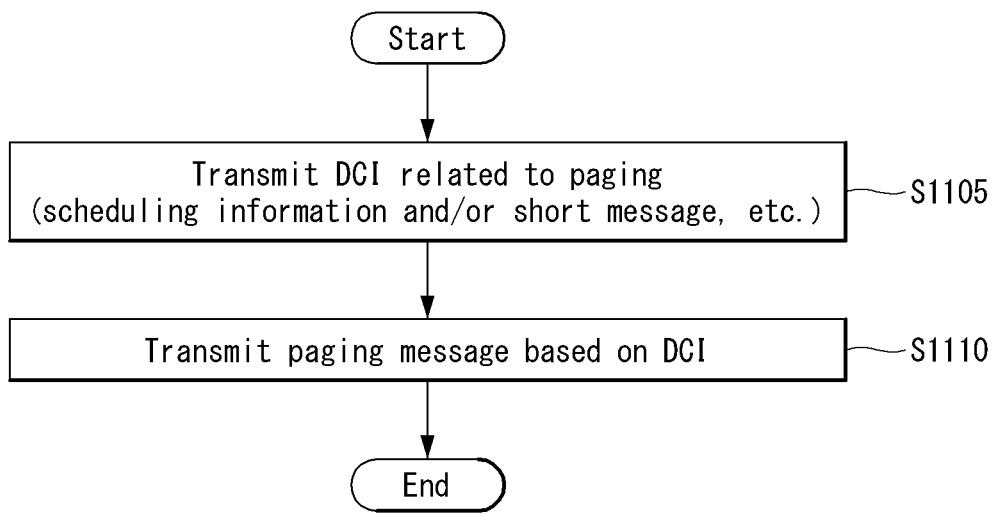
FIG. 11 illustrates an example of an operation flowchart of a base station transmitting a paging message in a wireless communication system to which the method proposed in the present disclosure may be applied.

FIG. 11 illustrates an example of an operation flowchart of a base station transmitting a paging message in a wireless communication system to which the method proposed in the present disclosure may be applied. FIG. 11 is shown just for convenience of the description and does not limit the scope of the present invention.

Referring to FIG. 11, when a UE and/or a base station perform a paging operation (e.g., operation of transmitting and receiving a paging message), it is assumed the operation is based on the method described in the present disclosure, that is, the method of using the DCI format for paging described above. As an example, the DCI described herein may be a DCI format which is scrambled by P-RNTI related to paging (e.g., DCI format 1_0 CRC-scrambled by P-RNTI).

First, the base station may transmit downlink control information (DCI) related to the paging message to the UE (step, S1105). As an example, the DCI may correspond to the DCI format described above in the present disclosure (e.g., the DCI format shown in FIG. 9).

Particularly, the DCI may include resource allocation information for the paging message and/or a short message related to system information. For example, the resource allocation information may be the scheduling information described above, and the short message may be referred to as direct indication information.

As described above, the short message may include at least one of information related to a modification of the system information, indication information for Earthquake and Tsunami Warning System (ETWS) or indication information for Commercial Mobile Alert System (CMAS). Particularly, the indication information for Earthquake and Tsunami Warning System (ETWS) and the indication information for Commercial Mobile Alert System (CMAS) may set to a high priority in the system information (e.g., system information (indicator) of high priority).

In addition, the DCI may include at least one bit representing whether the resource allocation information and/or the short message are/is included in the DCI. At this time, as described above, the number of the at least one bit may be 2 (i.e., 2 bits). In this case, a value of the at least one bit may be configured to indicate i) a first state which for a case that the resource allocation information is included in the DCI, ii) a second state which for a case that the short message is included in the DCI, or iii) a third state which for a case that the resource allocation information and the short message are included in the DCI. As an example, the at least one bit may be the bit for short message indicator and the bit for SI message indicator shown in FIG. 9.

Later, the base station may transmit the paging message based on the DCI to the UE (step, S1110). As an example, the paging message may be carried by a physical downlink shared channel (PDSCH) and the like which is scheduled by the DCI.

At this time, in the case that the short message is included in the DCI, the short message may be configured not to be forwarded through the paging message scheduled by the DCI. That is, in the case that the short message is included in the DCI, the UE may not perform decoding for the corresponding PDSCH.

In relation to this, in the aspect of implementation, the operation of the base station described above may be particularly implemented by the base station (eNB) 1210 or 1310 shown in FIG. 12 and FIG. 13 of the present disclosure. For example, the operation of the UE described above may be performed by a processor 1211 or 1311 and/or a Radio Frequency (RF) unit (or module) 1213 or 1315.

The base station performing paging (i.e., operation of transmitting and receiving a paging message) in a wireless communication system may include a transmitter for transmitting a wireless signal, a receiver for receiving a wireless signal and a processor functionally connected with the transmitter and the receiver. Here, the transmitter and the receiver may be referred to as an RF unit (or module) for transmitting and receiving a wireless signal.

For example, the processor of the base station may control the (transmission) RF unit (or module) so as to transmit downlink control information (DCI) related to the paging message to the UE (step, S1105). As an example, the DCI may correspond to the DCI format described above in the present disclosure (e.g., the DCI format shown in FIG. 9).

Particularly, the DCI may include resource allocation information for the paging message and/or a short message related to system information. For example, the resource allocation information may be the scheduling information described above, and the short message may be referred to as direct indication information.

As described above, the short message may include at least one of information related to a modification of the system information, indication information for Earthquake and Tsunami Warning System (ETWS) or indication information for Commercial Mobile Alert System (CMAS). Particularly, the indication information for Earthquake and Tsunami Warning System (ETWS) and the indication information for Commercial Mobile Alert System (CMAS) may set to a high priority in the system information (e.g., system information (indicator) of high priority).

In addition, the DCI may include at least one bit representing whether the resource allocation information and/or the short message are/is included in the DCI. At this time, as described above, the number of the at least one bit may be 2 (i.e., 2 bits). In this case, a value of the at least one bit may be configured to indicate i) a first state which for a case that the resource allocation information is included in the DCI, ii) a second state which for a case that the short message is included in the DCI, or iii) a third state which for a case that the resource allocation information and the short message are included in the DCI. As an example, the at least one bit may be the bit for short message indicator and the bit for SI message indicator shown in FIG. 9.

Later, the processor of the base station may control the (transmission) RF unit (or module) so as to transmit the paging message based on the DCI to the UE (step, S1110). In other words, the processor of the base station may control the RF module to transmit the paging message scheduled by the DCI (to the UE) and perform the paging operation. As an example, the paging message may be carried by a physical downlink shared channel (PDSCH) and the like which is scheduled by the DCI.

At this time, in the case that the short message is included in the DCI, the short message may be configured not to be forwarded through the paging message scheduled by the DCI. That is, in the case that the short message is included in the DCI, the processor of the UE may control not to perform decoding for the corresponding PDSCH.

The paging operation and the DCI format of the UE and/or the base station described above have an advantage that an efficient paging operation can be supported even for the case that both of scheduling information and a short message are included in DCI for paging as well as the case that either one of scheduling information or a short message is included in DCI for paging. According to the operation, there is an advantage that PDSCH decoding overhead and delay of a User Equipment related to paging can be reduced, and unnecessary paging message/reception for PDSCH/decoding operation can be reduced.

General Apparatus to Which the Present Invention May Be Applied

FIG. 12 illustrates an example of a block diagram of a wireless communication apparatus to which the method proposed in the present disclosure may be applied.

Referring to FIG. 12, a wireless communication system includes a base station (eNB) 1210 and multiple UEs 1220 located in an area of the base station.

Each of the base station and the UE may be represented as a wireless device.

The base station 1210 includes a processor 1211, a memory 1212 and a radio frequency (RF) unit 1213. The processor 1211 implements the functions, processes and/or methods proposed in FIG. 1 to FIG. 11 above. The layers of a wired/wireless interface protocol may be implemented by the processor. The memory is connected to the processor and stores various pieces of information for driving the processor. The RF unit is connected to the processor and transmits and/or receives radio signals.

The UE includes a processor 1221, a memory 1222 and an RF unit 1223.

The processor implements the functions, processes and/or methods proposed in FIG. 1 to FIG. 11 above. The layers of a radio interface protocol may be implemented by the processor. The memory is connected to the processor and stores various pieces of information for driving the processor. The RF unit is connected to the processor and transmits and/or receives radio signals.

The memory 1212 or 1222 may be located inside or outside the processor 1211 or 1221 and may be connected to the processor by various well-known means.

Furthermore, the base station and/or the UE may have a single antenna or multiple antennas.

The antenna 1214 or 1224 functions of transmitting and receiving a wireless signal.

FIG. 13 illustrates another example of a block diagram of a wireless communication apparatus to which the method proposed in the present disclosure may be applied.

Referring to FIG. 13, a wireless communication system includes a base station (eNB) 1310 and multiple UEs 1320 located in an area of the base station. The base station may be represented as a transmitting apparatus and the UE may be represented as a receiving apparatus, and vice versa. The base station and the UE include processors 1311 and 1321, memories 1314 and 1324, one or more Tx/Rx radio frequency (RF) modules 1315 and 1325, Tx processors 1312 and 1322, Rx processors 1313 and 1323 and antennas 1316 and 1326. The processor implements the functions, processes and/or methods described above. More particularly, in DL (communication from the base station to the UE), a higher layer packet from a core network is provided with the processor 1311. The processor implements the function of L2 layer. In DL, the processor provides multiplexing between a logical channel and a transport channel and radio resource allocation to the UE 1320, and takes in charge of signaling to the UE. The Tx processor 1312 implements various signal processing functions for L1 layer (i.e., physical layer). The signal processing function makes forward error correction (FEC) easy in the UE and includes coding and interleaving. Coded and modulated symbol is partitioned into parallel streams, each of the streams is mapped to OFDM subcarrier and multiplexed with a reference signal (RS) in time and/or frequency domain and combined by using Inverse Fast Fourier Transform (IFFT) and generates a physical channel that carries time domain OFDMA symbol stream. The OFDM stream is precoded spatially to generate multiple spatial streams. Each of the spatial streams may be provided to different antennas 1316 through individual Tx/Rx module (or transceiver; 1315). Each Tx/Rx module may modulate RF carrier as its own spatial stream for transport. In the UE, each Tx/Rx module (or transceiver; 1325) receives signal through each antenna 1326 of each Tx/Rx module. Each Tx/Rx module reconstructs modulated information with RF carrier and provides it to Rx processor 1323. The Rx processor implements various signal processing function of layer 1. The Rx processor may perform spatial processing with information to reconstruct an arbitrary spatial stream toward the UE. In the case that multiples spatial streams are toward to the UE, the multiples spatial streams may be combined with a single OFDMA symbol stream by multiple Rx processors. The Rx processor transforms OFDMA symbol stream from time domain to frequency domain by using fast Fourier transform (FFT). The frequency domain signal includes individual OFDMA symbol stream for each sub carrier of OFDM signal. Symbols and reference signal on each subcarrier may be reconstructed and demodulated by deciding the most probable signal arrangement points transmitted by the base station. Such soft decisions may be based on channel estimation values. The soft decisions are decoded and deinterleaved to reconstruct originally transmitted data and control signal by the base station in a physical channel. The corresponding data and control signal are provided to the processor 1321.

UL (communication from the UE to the base station) is processed in the base station 1310 in the similar way described in relation to the receiver function in the UE 1320. Each Tx/Rx module 1325 receives a signal through each antenna 1326. Each Tx/Rx module provides RF carrier and information to the Rx processor 1323. The processor 1321 may be related to the memory 1324 that stores program code and data. The memory may be referred to as a computer readable medium.

The aforementioned embodiments are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

INDUSTRIAL APPLICABILITY

Examples in which the method for transmitting and receiving the control information for paging in a wireless communication system according to the present invention has been applied to 3GPP LTE/LTE-A systems and 5G system (New RAT system) have been described, but the method may be applied to various wireless communication systems in addition to the 3GPP LTE/LTE-A systems and 5G system (New RAT system).

What is claimed is:
1. A method of receiving, by a User Equipment (UE), a paging message in a wireless communication system, the method comprising:
 receiving, from a base station (BS), downlink control information (DCI) related to the paging message; and
 receiving, from the BS, the paging message based on the DCI,
 wherein the DCI includes resource allocation information for the paging message and/or a short message related to system information, and
 wherein the DCI includes 2 bit information representing whether the resource allocation information is included in the DCI and whether the short message is included in the DCI.
2. The method of claim 1, wherein the short message includes at least one of information related to a modification of the system information, indication information for Earthquake and Tsunami Warning System (ETWS) or indication information for Commercial Mobile Alert System (CMAS).
3. The method of claim 2, wherein the indication information for Earthquake and Tsunami Warning System (ETWS) and the indication information for Commercial Mobile Alert System (CMAS) are set to a high priority in the system information.
4. The method of claim 2, wherein a value of the 2 bit information indicates i) a first state for a case that the resource allocation information is included in the DCI, ii) a second state for a case that the short message is included in the DCI, or iii) a third state for a case that the resource allocation information and the short message are included in the DCI.
5. The method of claim 2, wherein based on the short message being included in the DCI, the short message is not forwarded through the paging message scheduled by the DCI.
6. The method of claim 2, wherein the DCI is scrambling by Paging-Radio Network Temporary Identifier (P-RNTI) related to the paging message.

7. A User Equipment (UE) configured to receive a paging message in a wireless communication system, the UE comprising:
- at least one transceiver configured to transmit and receive a radio signal; and
- at least one processor functionally connected with the at least one transceiver,
- wherein the at least one processor is configured to control the UE to:
- receive, from a base station (BS), downlink control information (DCI) related to the paging message; and
- receive, from the BS, the paging message based on the DCI,
- wherein the DCI includes resource allocation information for the paging message and/or a short message related to system information, and
- wherein the DCI includes 2 bit information representing whether the resource allocation information is included in the DCI and whether the short message is included in the DCI.

8. The UE of claim 7, wherein the short message includes at least one of information related to a modification of the system information, indication information for Earthquake and Tsunami Warning System (ETWS) or indication information for Commercial Mobile Alert System (CMAS).

9. The UE of claim 8, wherein the indication information for Earthquake and Tsunami Warning System (ETWS) and the indication information for Commercial Mobile Alert System (CMAS) are set to a high priority in the system information.

10. The User Equipment UE of claim 8, wherein a value of the 2 bit information indicates i) a first state for a case that the resource allocation information is included in the DCI, ii) a second state for a case that the short message is included in the DCI, and iii) a third state for a case that the resource allocation information and the short message are included in the DCI.

11. The UE of claim 8, wherein based on the short message being included in the DCI, the short message is not forwarded through the paging message scheduled by the DCI.

12. The UE of claim 8, wherein the DCI is scrambling by Paging-Radio Network Temporary Identifier (P-RNTI) related to the paging message.

13. A base station (BS) configured to transmit a paging message in a wireless communication system, the BS comprising:
- at least one transceiver configured to transmit and receive a radio signal; and
- at least one processor functionally connected with the at least one transceiver,
- wherein the at least one processor is configured to control the BS to:
- transmit, to a User Equipment (UE), downlink control information (DCI) related to the paging message; and
- transmit, to the UE, the paging message based on the DCI,
- wherein the DCI includes resource allocation information for the paging message and/or a short message related to system information, and
- wherein the DCI includes 2 bit information representing whether the resource allocation information is included in the DCI and whether the short message is included in the DCI.

* * * * *